(12) United States Patent
Tonegawa

(10) Patent No.: US 10,057,435 B2
(45) Date of Patent: *Aug. 21, 2018

(54) TRANSMISSION APPARATUS, RECEPTION APPARATUS, CONTROL METHOD THEREOF, COMMUNICATION SYSTEM, AND PROGRAM

(71) Applicant: CANON KABUSHIKI KAISHA, Tokyo (JP)

(72) Inventor: Nobuyuki Tonegawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/284,190

(22) Filed: May 21, 2014

(65) Prior Publication Data

US 2014/0253971 A1  Sep. 11, 2014

Related U.S. Application Data

(63) Continuation of application No. 11/574,151, filed as application No. PCT/JP2006/325685 on Dec. 19, 2006, now Pat. No. 8,775,522.

(30) Foreign Application Priority Data

Dec. 26, 2005 (JP) ................................. 2005-373519

(51) Int. Cl.
*G06F 15/16* (2006.01)
*H04N 1/00* (2006.01)
(Continued)

(52) U.S. Cl.
CPC ......... *H04N 1/00209* (2013.01); *H04L 51/30* (2013.01); *H04N 1/0022* (2013.01);
(Continued)

(58) Field of Classification Search
CPC .................................................. H04N 1/00209
(Continued)

(56) References Cited

U.S. PATENT DOCUMENTS 6,577,328 B2 * 6/2003 Matsuda ................. A63F 13/12
345/419
6,687,742 B1  2/2004 Iwazaki ........................ 709/206
(Continued)

FOREIGN PATENT DOCUMENTS

CN  1628292  6/2005
EP  1519527  3/2005
(Continued)

OTHER PUBLICATIONS

English translation of Japanese Patent Application Laid-Open No. 2003-018381, 18 pages.
(Continued)

*Primary Examiner* — Evans Desrosiers
(74) *Attorney, Agent, or Firm* — Fitzpatrick, Cella, Harper & Scinto

(57) ABSTRACT

A transmission apparatus transmits e-mail to a reception apparatus through a network by selecting one of a communication method via a mail server and a communication method without intervention of a mail server. This transmission apparatus generates the e-mail and transmits, to the reception apparatus, the e-mail and information representing the reply method of a transmittal confirmation request in response to the e-mail. The transmission apparatus receives, from the reception apparatus in accordance with the reply method, a transmittal confirmation result in response to the transmitted e-mail.

19 Claims, 12 Drawing Sheets

(51) Int. Cl.
  *H04L 12/58* (2006.01)
  *G06F 15/177* (2006.01)
(52) U.S. Cl.
  CPC ..... *H04N 1/00212* (2013.01); *H04N 1/00214* (2013.01); *H04N 1/00217* (2013.01); *H04N 1/00244* (2013.01); *H04N 1/00973* (2013.01); *H04N 2201/0018* (2013.01); *H04N 2201/0094* (2013.01)
(58) Field of Classification Search
  USPC .................................................. 709/201–209
  See application file for complete search history.

(56) References Cited

U.S. PATENT DOCUMENTS

| | | | | |
|---|---|---|---|---|
| 7,519,559 | B1* | 4/2009 | Appelman | H04L 63/08 705/60 |
| 2002/0194282 | A1* | 12/2002 | Saito | H04N 1/00137 709/206 |
| 2004/0024829 | A1 | 2/2004 | Tanimoto | 709/206 |
| 2004/0042043 | A1 | 3/2004 | Itagaki | 358/1.15 |
| 2004/0193924 | A1 | 9/2004 | Kira et al. | 713/201 |
| 2005/0071500 | A1 | 3/2005 | Tonegawa | 709/236 |
| 2005/0225809 | A1 | 10/2005 | Tonegawa | 358/402 |
| 2006/0168004 | A1* | 7/2006 | Choe | G06Q 10/107 709/206 |
| 2007/0143407 | A1 | 6/2007 | Avritch et al. | 709/206 |
| 2008/0082615 | A1 | 4/2008 | Shinohara | 709/206 |
| 2009/0150493 | A1 | 6/2009 | Tonegawa | 709/206 |

FOREIGN PATENT DOCUMENTS

| | | |
|---|---|---|
| JP | 2002-027193 | 1/2002 |
| JP | 2002-271413 | 9/2002 |
| JP | 2002-368815 | 12/2002 |
| JP | 2003-018381 | 1/2003 |
| JP | 2003-233558 | 8/2003 |
| JP | 2004-023121 | 1/2004 |
| JP | 2004-247841 | 9/2004 |
| JP | 2004-312111 | 11/2004 |
| JP | 2005-101936 | 4/2005 |
| JP | 2005-208801 | 8/2005 |
| JP | 2007-180614 | 7/2007 |
| WO | 03/067440 | 8/2003 |
| WO | 2004/082259 | 9/2004 |
| WO | 2006/106565 | 10/2006 |

OTHER PUBLICATIONS

English translation of Japanese Patent Application Laid-Open No. 2004-247841, 69 pages.

Office Action from counterpart Chinese Patent Application No. 2006-80049356.8, with English translation dated Mar. 11, 2010. 17 pages.

Extended European Search Report in European Patent Application No. 06843116.2, dated Sep. 21, 2009. 7 pages.

Victoria Bellotti et al., "Innovation in Extremis: Evolving an Application for the Critical Work of Email and Information Management", 2002; ACM; 1-58113-515-7/02/0006; 181-192.

* cited by examiner

FIG. 5

```
300  Date: Wed, 09 Mar 2005 10:37:27 +0900
301  From: COPY1 <ifax@copy1.xyz.co.jp>
302  To: COPY2 <ifax@copy2.xyz.co.jp>
303  Subject: image
304  Disposition-Notification-To: ifax@copy1.xyz.co.jp
305  Message-Id: <20050309103652.AA31.IFAX@copy1.xyz.co.jp>
306  MIME-Version: 1.0
307  Content-Type: multipart/mixed; boundary="------_422E51E54FF704D75EF8_"
308  Content-Transfer-Encoding: 7bit
309
310  ------_422E51E54FF704D75EF8_
311  Content-Type: text/plain; charset="ISO-2022-JP"
312  Content-Transfer-Encoding: 7bit
313
314  $B;qNA$rAw$j$^$9!# (B
315
316  ------_422E51E54FF704D75EF8_
317  Content-Type: image/tiff; name="GS2005.tif"
318  Content-Disposition: attachment; filename="GS2005.tif"
319  Content-Transfer-Encoding: base64
320
321  0M8R4KGxGuEAAAAAAAAAAAAAAAAAAAAAPgADAP7/CQAGAAAAAAAAAAAAAAADAAAAGQEAAAAAAAAA
322  bh7w6mkAALzGmp3CV7EzZlloP33Eab/fVBORw0KGgoAAAANSUhEUgAAAKEAAAB3CAIAAADkVLfT
323  AAAAXNSR0IArs4c6QAAAA1wSFlzAAA0xAAADsQBlSs0GwAAaX5JREFUeF7t/XeQLe153gmmPd57
324  W6d83boE3fo9ehGwEwBEwBEGCAj3i3DMaEcKSqRlRxGKW5od/nfblyk2Q3F7owXFFE0M9KKpES1
325  AAAAAAAAAAAAAAAAAAAAAAAAAAAAAAAAAAAAAAAAAAAAAAAAAAAAAAAAAAAAAAAAAAAAAAAAAA
326  AAAAAAAAAAAAAAAAAAAAAAAAAAAAAAAAAAAAAAAAAAAAAAAAAAAAAAAAAAAAAAAAAAAAAAAAAAAAA
327  ///////////wAAAAAAAAAAAAAAAAAAAAAAAAAAAAAAAAAAAAAAAAAAAAAAAAAAAAAAAAAAAAAAAP//
328  AA==
329
330  ------_422E51E54FF704D75EF8_--
```

FIG. 8

600 Date: Wed, 09 Mar 2005 10:37:27 +0900
601 From: COPY2 <ifax@copy2.xyz.co.jp>
602 Subject: Message Disposition Notification
603 To: ifax@copy1.xyz.co.jp
604 Message-ID: <20050309103653.AB45.IFAX@copy2.xyz.co.jp>
605 MIME-version: 1.0
606 Content-type: multipart/report; report-type=disposition-notification;
607     boundary="xiSCzkWI5qc0+uiWI6qaM+ueTIB6"
608
609 --xiSCzkWI5qc0+uiWI6qaM+ueTIB6
610 Content-type: text/plain
611
612 The message sent on Wed, 09 Mar 2005 10:37:27 +0900 to
613     ifax@copy2.xyz.co.jp has been image created.
614
615 --xiSCzkWI5qc0+uiWI6qaM+ueTIB6
616 Content-type: message/disposition-notification
617
618 Reporting-UA: copy2.xyz.co.jp
619 Original-Message-ID: <20050309103652.AA31.IFAX@copy1.xyz.co.jp>
620 Disposition: automatic-action/MDN-sent-automatically; dispatched
621
622 --xiSCzkWI5qc0+uiWI6qaM+ueTIB6--

FIG. 11

| | |
|---|---|
| 900 | Date: Wed, 09 Mar 2005 10:37:27 +0900 |
| 901 | From: COPY1 <ifax@copy1.xyz.co.jp> |
| 902 | To: COPY2 <ifax@copy2.xyz.co.jp> |
| 903 | Subject: image |
| 904 | Disposition-Notification-To: ifax@copy1.xyz.co.jp |
| 905 | X-MDNDIRECT |
| 906 | Message-Id: <20050309103652.AA31.IFAX@copy1.xyz.co.jp> |
| 907 | MIME-Version: 1.0 |
| 908 | Content-Type: multipart/mixed; boundary="-----_422E51E54FF704D75EF8_" |
| 909 | Content-Transfer-Encoding: 7bit |
| 910 | |
| 911 | -------_422E51E54FF704D75EF8_ |
| 912 | Content-Type: text/plain; charset="ISO-2022-JP" |
| 913 | Content-Transfer-Encoding: 7bit |
| 914 | |
| 915 | $BqNA$rAw$j$^$9!# (B |
| 916 | |
| 917 | -------_422E51E54FF704D75EF8_ |
| 918 | Content-Type: image/tiff; name="GS2005.tif" |
| 919 | Content-Disposition: attachment; filename="GS2005.tif" |
| 920 | Content-Transfer-Encoding: base64 |
| 921 | |
| 922 | 0M8R4KGxGuEAAAAAAAAAAAAAAAAAAAAAPgADAP7/CQGAAAAAAAAADAAAAGQEAAAAAAAA |
| 923 | bh7w6mkAALzGmp3CV7EzZIIoP33Eab/lVBORw0KGgoAAAANSUhEUgAAAKEAAAB3CAIAAADKVLfT |
| 924 | AAAAXNSR0IArs4c6QAAAA1wSFlzAAA0xAAADsQBlSs0GwAAaX5JREFUeF7tXeQLe153gmmPd57 |
| 925 | W6d83boe3ehGo9EwBEGCAj3FobiamVDMaEcKSqRlRxGK0W5od/nfblyk2Q3F3ow0XFE0M9KKpESl |
| 926 | AAAAAAAAAAAAAAAAAAAAAAAAAAAAAAAAAAAAAAAAAAAAAAAAAAAAAAAAAAAAAAAAAAAAAAAAAAA |
| 927 | AAAAAAAAAAAAAAAAAAAAAAAAAAAAAAAAAAAAAAAAAAAAAAAAAAAAAAAAAAAAAAAAAAAAAAAAAAAP// |
| 928 | //////////IwAAAAAAAAAAAAAAAAAAAAAAAAAAAAAAAAAAAAAAAAAAAAAAAAAAAAAAAAAAAAAAAAAAA |
| 929 | AA== |
| 930 | |
| 931 | -------_422E51E54FF704D75EF8_-- |

TRANSMISSION APPARATUS, RECEPTION APPARATUS, CONTROL METHOD THEREOF, COMMUNICATION SYSTEM, AND PROGRAM

This application is a continuation of U.S. patent application Ser. No. 11/574,151, filed Feb. 23, 2007 (currently pending), which is a national stage application, under § 371 of PCT/JP2006/325685 filed Dec. 19, 2006, both of which are hereby incorporated by reference herein in their entirety, as if fully set forth herein, and claims the benefit of priority under 35 U.S.C. § 119, based on Japanese Priority Application No. 2005-373519, filed Dec. 26, 2005, which is incorporated by reference herein in its entirety, as if fully set forth herein.

TECHNICAL FIELD

The present invention relates to a communication system which transmits/receives e-mails between a transmission apparatus and a reception apparatus through a network.

BACKGROUND ART

The use of E-mails to transmit/receive text information is becoming popular along with the recent widespread use of computers and networking of information.

E-mail can have attached files of various formats in addition to a mail text, i.e., text information. Internet FAX (to be referred to as IFAX hereinafter) is coming into wide use, which transmits/receives an image by attaching, e.g., a TIFF (Tag Image File Format) file.

The IFAX is a technique for inter-device communication. That is, a transmission device reads an image by a scanner, converts it into a TIFF image, and transmits the data to a destination. A reception device decodes the TIFF image from the received data and prints it.

In relation to this technique, Japanese Patent Laid-Open No. 2002-27193 discloses an apparatus for transmitting image data by using an e-mail protocol. This apparatus transmits image data directly to a reception device without intervention of a mail server.

Japanese Patent Laid-Open No. 2003-233558 also discloses an apparatus for transmitting image data by using an e-mail protocol. This apparatus holds, for each destination on an address book, data representing whether to transmit image data directly to a reception device without intervention of a mail server. On the basis of this data, the apparatus directly transmits data to a reception device at a destination that allows direct transmission without intervention of a mail server.

RFC2532 defines the Full Mode standard of IFAX. According to this standard, when a transmission device transmits image data to a reception device, the reception device notifies the transmission device of the reception result using MDN (Message Disposition Notification).

In a system that causes a transmission device to transmit image data to a reception device without intervention of a mail server in accordance with the Full Mode standard, the arrangements disclosed in Japanese Patent Laid-Open Nos. 2002-27193 and 2003-233558 can directly transmit image data from the transmission device to the reception device.

However, the reception device that should transmit the MDN result to the transmission device cannot determine whether the MDN transmission destination permits direct transmission or not.

The reception device always transmits MDN via a mail server which is therefore indispensable.

It is however not easy to install and operate a mail server. A system that is operated in only an environment capable of communication without intervention of a mail server includes, e.g., a system that transmits image data in accordance with an e-mail protocol without building a mail server. In IFAX that transmits a large image file regardless of the presence of a mail server, the load on the mail server poses a problem. Hence, setting is often done while intentionally avoiding use of a mail server.

In a system where a reception device successfully receives e-mail data, analyzes it, and extracts an image, the success of data reception does not always indicate the success of image formation in the reception device based on the data. If a failure such as exhausting of the capacity of the internal data storage device of the reception device halfway through the process occurs, image formation in the reception device fails.

To finally confirm the success of communication, confirmation by MDN is necessary. In an environment where no mail server is installed or set, MDN transmission does not occur. It is therefore impossible to determine whether the reception device have normally received the transmitted e-mail data.

Disclosure of Invention

The present invention has been made in consideration of the above-described problem, and has as its object to provide a transmission apparatus, reception apparatus, control method thereof, communication system, and program which allow to adaptively select the transmission/reception route of an e-mail transmittal confirmation in accordance with the environment between the apparatuses and reliably transmit the transmittal confirmation.

According to the present invention, the foregoing object is attained by providing a transmission apparatus for transmitting e-mail to a reception apparatus through a network by selecting one of a communication method via a mail server and a communication method without intervention of a mail server, comprising:

a generation unit adapted to generate the e-mail;

a transmission unit adapted to transmit, to the reception apparatus, the e-mail and information representing a reply method of a transmittal confirmation request in response to the e-mail; and a reception unit adapted to receive, from the reception apparatus in accordance with the reply method, a transmittal confirmation result in response to the e-mail transmitted by the transmission unit.

In a preferred embodiment, the transmission unit transmits the information representing the transmittal confirmation request reply method to the reception apparatus without intervention of a mail server as one of pieces of information of a predetermined communication protocol.

In a preferred embodiment, the transmission unit transmits e-mail containing the information representing the transmittal confirmation request reply method to the reception apparatus without intervention of a mail server by using a predetermined communication protocol.

According to the present invention, the foregoing object is attained by providing a reception apparatus for receiving e-mail from a transmission apparatus through a network by using one of a communication method via a mail server and a communication method without intervention of a mail server, comprising:

a reception unit adapted to receive, from the transmission apparatus, the e-mail and information representing a reply method of a transmittal confirmation request in response to the e-mail; and a transmission unit adapted to transmit a transmittal confirmation result in response to the e-mail on the basis of the information representing the transmittal confirmation request reply method.

In a preferred embodiment, the reception unit receives the information representing the transmittal confirmation request reply method from the transmission apparatus without intervention of a mail server as one of pieces of information of a predetermined communication protocol.

In a preferred embodiment, the reception unit receives e-mail containing the information representing the transmittal confirmation request reply method from the transmission apparatus without intervention of a mail server by using a predetermined communication protocol.

In a preferred embodiment, when the information representing the transmittal confirmation request reply method is set to "server intervention OFF", the transmission unit transmits, without intervention of a mail server, the transmittal confirmation result to a reply destination represented by reply destination information described in the e-mail.

In a preferred embodiment, when the information representing the transmittal confirmation request reply method is set to "server intervention OFF", the transmission unit acquires reply destination information of the transmittal confirmation result in response to the e-mail from an external server and transmits, without intervention of a mail server, the transmittal confirmation result to a reply destination represented by the acquired reply destination information.

In a preferred embodiment, the transmission unit comprises an analysis unit adapted to analyze contents of the e-mail, and a generation unit adapted to generate the transmittal confirmation result if a result of analysis by the analysis unit indicates that reply destination information of the transmittal confirmation result in response to the e-mail is described.

In a preferred embodiment, when the result of analysis by the analysis unit indicates that the information representing the transmittal confirmation request reply method is set to "server intervention OFF" in the e-mail, and the reply destination information of the transmittal confirmation result in response to the e-mail is described, the transmission unit transmits, without intervention of a mail server, the transmittal confirmation result generated by the generation unit to a reply destination represented by the reply destination information.

In a preferred embodiment, when the result of analysis by the analysis unit indicates that the information representing the transmittal confirmation request reply method is set to "server intervention OFF" in the e-mail, and the reply destination information of the transmittal confirmation result in response to the e-mail is not described, the transmission unit acquires the reply destination information of the transmittal confirmation result in response to the e-mail from an external server and transmits, without intervention of a mail server, the transmittal confirmation result to a reply destination represented by the acquired reply destination information.

According to the present invention, the foregoing object is attained by providing a communication system for transmitting/receiving e-mail between a transmission apparatus and a reception apparatus through a network by using one of a communication method via a mail server and a communication method without intervention of a mail server, wherein the transmission apparatus comprises:

a generation unit adapted to generate the e-mail;

a first transmission unit adapted to transmit, to the reception apparatus, the e-mail and information representing a reply method of a transmittal confirmation request in response to the e-mail; and a first reception unit adapted to receive, from the reception apparatus in accordance with the reply method, a transmittal confirmation result in response to the e-mail transmitted by the first transmission unit, and the reception apparatus comprises:

a second reception unit adapted to receive, from the transmission apparatus, the e-mail and the information representing the reply method of the transmittal confirmation request in response to the e-mail; and a second transmission unit adapted to transmit a transmittal confirmation result in response to the e-mail on the basis of the information representing the transmittal confirmation request reply method.

According to the present invention, the forgoing object is attained by providing a control method of a transmission apparatus for transmitting e-mail to a reception apparatus through a network by selecting one of a communication method via a mail server and a communication method without intervention of a mail server, comprising:

a generation step of generating the e-mail;

a transmission step of transmitting, to the reception apparatus, the e-mail and information representing a reply method of a transmittal confirmation request in response to the e-mail; and a reception step of receiving, from the reception apparatus in accordance with the reply method, a transmittal confirmation result in response to the e-mail transmitted in the transmission step.

According to the present invention, the foregoing object is attained by providing a control method of a reception apparatus for receiving e-mail from a transmission apparatus through a network by using one of a communication method via a mail server and a communication method without intervention of a mail server, comprising:

a reception step of receiving, from the transmission apparatus, the e-mail and information representing a reply method of a transmittal confirmation request in response to the e-mail; and a transmission step of transmitting a transmittal confirmation result in response to the e-mail on the basis of the information representing the transmittal confirmation request reply method.

According to the present invention, the foregoing object is attained by providing a program stored in a computer-readable medium, which causes a computer to control a transmission apparatus for transmitting e-mail to a reception apparatus through a network by selecting one of a communication method via a mail server and a communication method without intervention of a mail server, characterized by causing the computer to execute:

a generation step of generating the e-mail;

a transmission step of transmitting, to the reception apparatus, the e-mail and information representing a reply method of a transmittal confirmation request in response to the e-mail; and a reception step of receiving, from the reception apparatus in accordance with the reply method, a transmittal confirmation result in response to the e-mail transmitted in the transmission step.

According to the present invention, the foregoing object is attained by providing a program stored in a computer-readable medium, which causes a computer to control a reception apparatus for receiving e-mail from a transmission apparatus through a network by using one of a communication method via a mail server and a communication method without intervention of a mail server, characterized by causing the computer to execute:

a reception step of receiving, from the transmission apparatus, the e-mail and information representing a reply method of a transmittal confirmation request in response to the e-mail; and a transmission step of transmitting a transmittal confirmation result in response to the e-mail on the basis of the information representing the transmittal confirmation request reply method.

Further features of the present invention will become apparent from the following description of exemplary embodiments with reference to the attached drawings.

BRIEF DESCRIPTION OF DRAWINGS

FIG. 5 is a view showing a structural example of e-mail data according to the first embodiment of the present invention;

FIG. 8 is a view showing a structural example of MDN data according to the first embodiment of the present invention;

FIG. 11 is a view showing a structural example of e-mail data according to the third embodiment of the present invention.

BEST MODE FOR CARRYING OUT THE INVENTION

The embodiments of the present invention will be described below in detail with reference to the accompanying drawings.

First Embodiment

Figure 1:
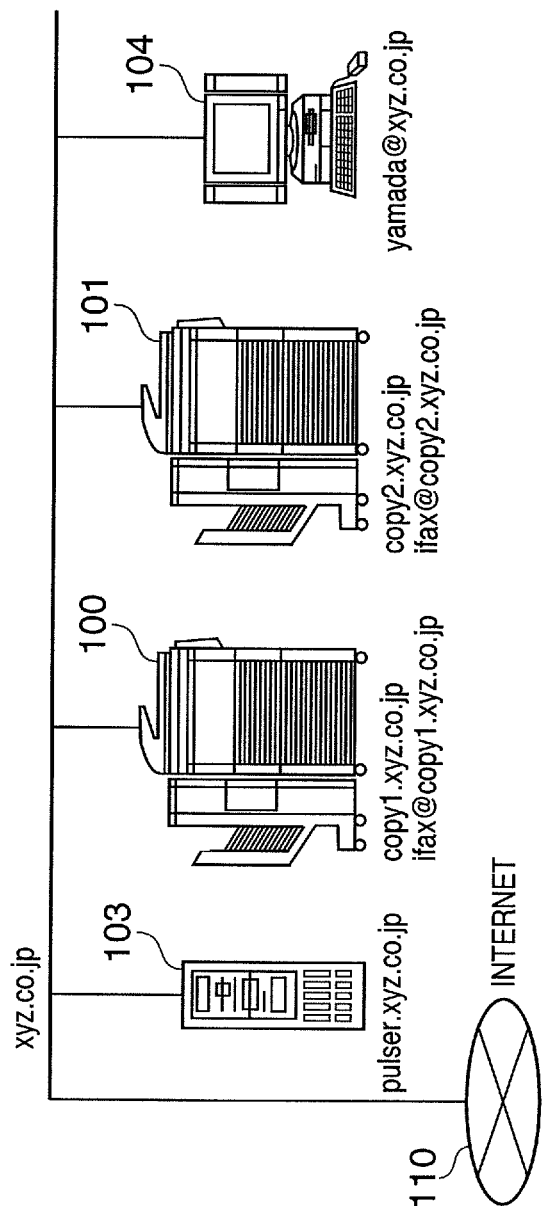
FIG. 1 is a block diagram showing the network connection configuration of a communication apparatus according to the first embodiment of the present invention.

FIG. 1 is a block diagram showing the network connection configuration of a communication apparatus according to the first embodiment of the present invention.

Reference numerals 100 and 101 denote MFPs (Multi Function Peripherals). The MFPs 100 and 101 are multi-function copying machines each including devices such as a scanner and a printer and thus having a plurality of functions such as a scanner function, copy function, FAX transmission/reception function, and printer function to print data created on a computer.

The MFPs 100 and 101 connect to a network with a domain name of, e.g., "xyz.co.jp" and to a plurality of computers and network devices including a server 103 and a client PC 104.

This network connects to Internet 110 that covers all over the world.

The MFP 100 has a HOST name "copy1.xyz.co.jp" and an e-mail address "ifax@copy1.xyz.co.jp" for the device. The MFP 101 has a HOST name "copy2.xyz.co.jp" and an e-mail address "ifax@copy2.xyz.co.jp" for the device.

The PC 104 incorporates general-purpose e-mail software and has a mail address "yamada@xyz.co.jp".

The server 103 has both a Mail server (SMTP server) function and a POP server function. The server 103 has a HOST name "pulser.xyz.co.jp" and also a DNS server function.

Separate terminals may be prepared as a server having a Mail server function, a server having a POP function, and a server having a DNS server function. An appropriately integrated terminal is also usable. Collectively managing the server having the DNS function as a terminal independent of the MFP 100 allows various kinds of MFPs to share the terminal that mutually converts domain names and IP addresses.

If a domain name or IP address changes, only the server needs to change the setting. The MFP 100 may incorporate the DNS server function. In this case, the process efficiency is expected to rise because communication via the network is not executed.

The MFPs 100 and 101 have two kinds of transmission modes. One is an Email transmission mode that assumes to transmit an image received by the FAX/IFAX reception function and a monochrome/color image read by the scanner to a general e-mail destination. The other is an IFAX transmission mode that assumes to transmit an image to an apparatus complying with the IFAX standard.

Data transmission/reception is done by using, e.g., SMTP and POP3 protocols.

The Email transmission mode enables to transmit a color image read by the scanner as a JPEG or PDF (Portable Document Format) file attached to e-mail. A monochrome image read by the scanner can be transmitted as a TIFF or PDF file.

For example, to transmit e-mail to the client 104 with the mail address "yamada@xyz.co.jp", e-mail containing attached image data is transmitted to the server 103 in accordance with the SMTP protocol. The client PC 104 can receive the e-mail in accordance with the POP3 protocol and display the attached image on a general-purpose image viewer.

The IFAX transmission mode transmits an image read by the scanner function of the MFP or image data received by the FAX/IFAX reception function as a TIFF image based on RFC2301. The receiving-side MFP prints the received image data by its printer function.

The arrangement of the MFP 100 will be described next with reference to FIG. 2.

The arrangement of the MFP 100 will be exemplified below. The MFP 101 has the same arrangement as the MFP 100.

Figure 2:
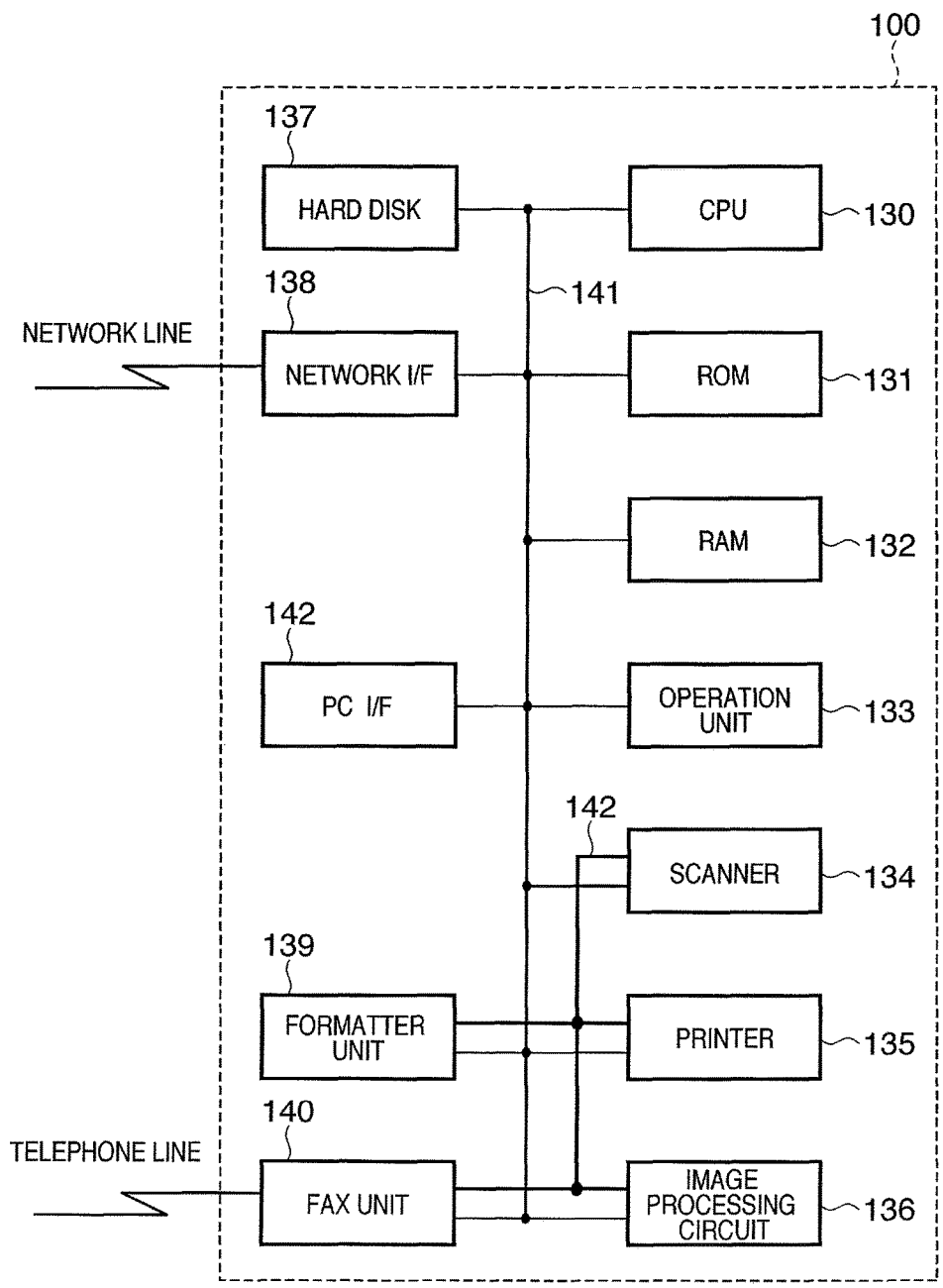
FIG. 2 is a block diagram showing the arrangement of an MFP according to the first embodiment of the present invention.

FIG. 2 is a block diagram showing the arrangement of the MFP according to the first embodiment of the present invention.

A CPU 130 controls the entire system by using a RAM 132 and programs stored in a ROM 131.

An operation unit 133 including an LCD display panel and hard keys such as a start key and ten-key pad executes user operation upon detecting user's finger touch on a soft button displayed on the LCD.

A scanner 134 photoelectrically converts image data of a document into an electrical signal. When a document feeder (not shown) feeds a document onto a platen glass, the scanner 134 turns on a lamp and starts moving a document reader to expose and scan the document.

Reflected light from the document is guided, through mirrors and lenses, to a CCD image sensor, converted into an electrical signal, and then converted into digital data by an A/D conversion circuit. After the end of the document reading operation, the document on the platen glass is discharged.

A printer 135 prints the image data on a printing paper sheet. A laser beam emitting unit emits a laser beam corresponding to the image data. The laser beam irradiates a photosensitive drum, on which a latent image corresponding to the laser beam is formed.

A developing unit applies a developing agent to the latent image portion on the photosensitive drum. A printing paper sheet is fed from a paper cassette and conveyed to a transfer unit in synchronism with the start of laser beam irradiation so that the developing agent applied to the photosensitive drum is transferred to the printing paper sheet. The printing paper sheet with the transferred developing agent is conveyed to a fixing unit, which fixes the developing agent to the printing paper sheet by heat and pressure. The printing paper sheet that has passed through the fixing unit is discharged by a discharge roller. A sorter sorts discharged printing paper sheets by storing them in appropriate bins.

An image processing circuit 136 including various kinds of circuits such as a mass image memory, image rotating circuit, resolution scaling circuit, and MH, MR, MMR, JBIG, and JPEG encoding/decoding circuits can execute various kinds of image processing such as shading, trimming, and masking.

A hard disk 137 is a mass recording medium connected through an I/F such as SCSI or IDE.

A network I/F 138 implements a network data link to connect a network line such as an Ethernet® represented by 10BASE-T or 100BASE-T or a token ring.

A formatter unit 139 receives data from an external device (e.g., client PC 104) through a PC I/F 142, including a parallel interface based on IEEE1284 and a serial interface such as a USB, or the network I/F 138. The formatter unit 139 creates image data from received data (e.g., PDL (Page Description Language)) and executes rendering to make the image processing circuit 136 process the data and the printer 135 to print it.

A fax unit 140 is a fax I/F circuit connected to a telephone line and including circuits such as an NCU (Network Control Unit) and a MODEM (MOdulator/DEModulator).

The fax unit 140 causes the image processing circuit 136 to process image data read by the scanner 134 and transmits the data to another FAX apparatus via the telephone line. The fax unit 140 also receives data transmitted from another FAX apparatus and causes the image processing circuit 136 to process the data and the printer 135 to print it.

The scanner 134, printer 135, image processing circuit 136, formatter unit 139, and fax unit 140 connect to a high-speed video bus 142 different from a CPU bus 141 from the CPU 130 to transfer image data at a high speed.

A copy function is implemented by making the image processing circuit 136 process image data read by the scanner 134 and making the printer 135 print the processed image data.

A Send (data transfer/file transfer) function is implemented by making the image processing circuit 136 process image data read by the scanner 134 and transmitting the data from the network I/F 138 to a network. An IFAX function is implemented by making the image processing circuit 136 create an image complying with RFC2301 and transmitting/receiving the data in accordance with an e-mail protocol.

The configuration of a network program installed in the MFP 100 will be described next with reference to FIG. 3.

Figure 3:
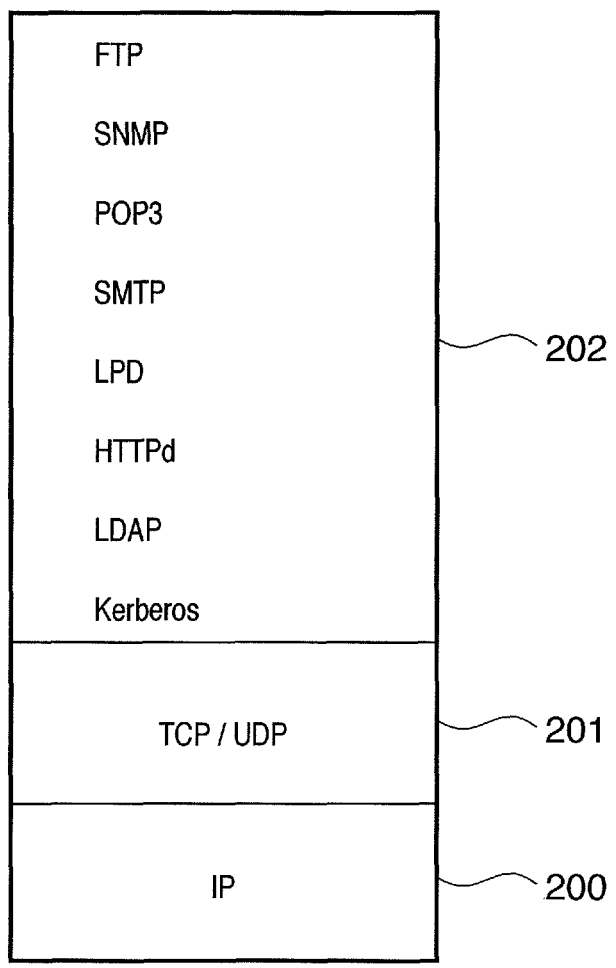
FIG. 3 is a view for explaining the configuration of a network program installed in the MFP according to the first embodiment of the present invention.

FIG. 3 is a view for explaining the configuration of a network program installed in the MFP according to the first embodiment of the present invention.

The network program is roughly divided into an IP layer 200, TCP/UDP layer 201, and application layer 202.

IP is short for "Internet Protocol". TCP is short for "Transmission Control Protocol". UDP is short for "User Datagram Protocol".

The IP layer 200 is an Internet protocol layer that provides a service to send a message from a source host to a destination host in cooperation with relay nodes such as routers.

The IP layer 200 manages the addresses of sources to transmit data and the addresses of destinations to receive data and executes a routing function of managing a route to send data to a destination host in the network in accordance with address information.

The TCP/UDP layer 201 is a transport layer that provides a service to send a message from a source application service to a reception application service.

TCP is a connection service that guarantees high communication reliability. UDP is a connectionless service that does not guarantee reliability.

The application layer 202 defines a plurality of protocols. Examples of the protocols are as follows.

FTP (File Transfer Protocol) is a file transfer service. SNMP is a network management protocol. LPD is a server protocol for printing using a printer. HTTPd is a WWW (World Wide Web) server protocol.

SMTP (Simple Mail Transfer Protocol) is an e-mail transmission/reception protocol. POP3 (Post Office Protocol-Version 3) is a mail download protocol. LDAP (Lightweight Directory Access Protocol) is a protocol to access a directory database that manages, e.g., a user's e-mail address. RFC1510 defines a Kerberos authentication program.

An example of the operation window of the operation unit 133 of the MFP 100 will be described next with reference to FIG. 4.

Figure 4:
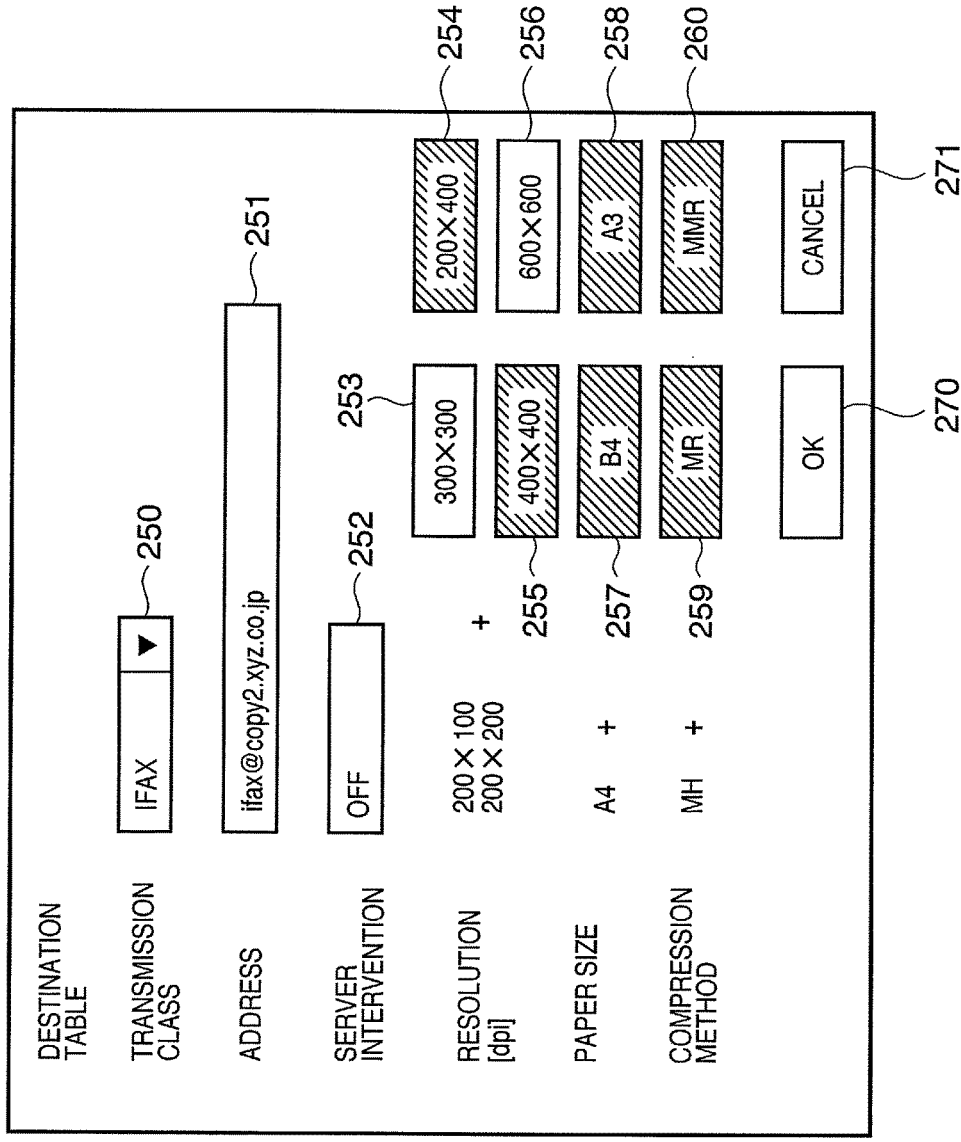
FIG. 4 is a view showing a destination table registration window to store the transmission destination information of the MFP according to the first embodiment of the present invention.

FIG. 4 shows a destination table registration window to store the transmission destination information of the MFP according to the first embodiment of the present invention.

This destination table registration window allows the user to register various kinds of destinations including the IFAX destination of the MFP 101.

A transmission class field 250 on the destination table registration window is an item to decide the technique to transmit data to a transmission destination. This field is designed as, e.g., a pull-down menu to select one of FAX, IFAX, Email, and File. In this example, IFAX is selected in the transmission class field 250.

When IFAX is selected, pieces of information such as an address, server intervention, resolution, paper size, and compression method are displayed.

An address field 251 is an item to input an address. In this example, the e-mail address "ifax@copy2.xyz.co.jp" of the MFP 101 is input to the address field 251.

A server intervention designation field 252 is a switch to select whether to transmit data to a mail server and then transmit it from the mail server to the MFP 101 as the target destination or directly transmit the data to the MFP 101. In this example, "OFF" is set to represent that no mail server intervenes. To make a mail server intervene, "ON" is set.

If data is to be sent to the transmission destination through the Internet, relay nodes such as a firewall exist so it is impossible to directly transmit the data. However, if the destination is present on the same network, data can be transmitted without any load on the mail server.

Resolution designation fields 253 to 256 are switches to designate resolutions receivable by the MFP 101.

Any device can normally receive images of resolutions of 200×100 dpi and 200×200 dpi by IFAX so the user cannot select these resolutions. The display states of the remaining resolutions are inverted every time the user manipulates the fields. A field displayed in a white-on-black state indicates that the resolution is selected.

In FIG. 4, the resolution designation fields 254 and 255 are selected, indicating that resolutions receivable by the MFP 101 are 200×400 dpi and 400×400 dpi.

For example, the MFP 101 cannot directly receive an image scanned at 600×600 dpi. In this case, the resolution of the scanned image is converted to the highest resolution receivable by the MFP 101, i.e., 400×400 dpi.

Paper size designation fields 257 and 258 are switches to designate paper sizes receivable by the MFP 101. Any device can normally receive an image of A4 size so the user cannot select A4.

The MFP 101 can receive images of B4 and A3 sizes. Hence, the paper size designation fields 257 and 258 are selected.

For example, an image read in the A3 size at the time of scanning is transmitted to the MFP 101 as an image of A3 size. If the receiving side cannot receive the image of A3 size, the image is transmitted after scaling to the maximum paper size receivable by the receiving side.

Compression method designation fields 259 and 260 are switches to select compressed image formats receivable by the MFP 101. In this example, the user can designate MR and MMR. The compression ratio of a document image containing a text becomes higher in an order of MH<MR<MMR.

Any device can normally receive MH-compressed image data so the user cannot select MH.

The MFP 101 can receive MR- and MMR-coded images. Hence, the compression method designation fields 259 and 260 are selected.

An image encoded by MMR at a high compression ratio is transmitted to the MFP 101. If the reception device cannot receive the MMR-coded image, the image is compressed by the compression method to ensure the maximum compression ratio receivable by the receiving side and then transmitted.

When various kinds of settings on the destination table registration window are complete, the user operates an OK button 270 to finalize the settings so that the various set values are stored in, e.g., the RAM 132 as a destination table. To cancel the setting operation, the user can reset the various set values by operating a cancel button 271.

A structural example of e-mail data according to the first embodiment will be described next with reference to FIG. 5.

FIG. 5 is a view showing a structural example of e-mail data according to the first embodiment of the present invention.

FIG. 5 shows an e-mail data structure when an image scanned by the MFP 100 is attached to e-mail and transmitted to the MFP 101.

A Date field 300 has time information indicating the time of transmission from the MFP 100. A From field 301 has the e-mail address of the MFP 100. A To field 302 has the e-mail address of the MFP 101. A Subject field 303 has a character string "image".

A Disposition-Notification-To field 304 designates a mail address to receive transmittal confirmation mail (MDN data) transmitted in response to a transmittal confirmation request from the MFP 100. In this example, the field 304 contains the mail address of the MFP 100.

A Message-ID field 305 has a number representing an ID unique to mail. The number contains mail address and time data to prevent existence of mail messages with the same number. A MIME-Version field 306 has the version number of MIME.

A Content-Type field 307 indicates that the e-mail data is segmented into a plurality of blocks by a character string "-----_422E51E54FF704D75EF8_". A field 308 represents the number of bits used for encoding.

Fields 310 to 316 constitute one block. The field 311 indicates that the following part contains a character string written by JIS codes. The field 314 contains a data character string, i.e., the text of the e-mail data.

The fields 316 to 330 constitute another block. Pieces of information in the fields 317 to 219 show that this part is a TIFF image file with a file name "GS2005.tif". The fields 321 to 328 have data obtained by BASE64-encoding the file.

The process sequence of the SMTP protocol in transmitting the e-mail data shown in FIG. 5 according to the first embodiment of the present invention directly from the MFP 100 to the MFP 101 will be described next with reference to FIG. 6.

Figure 6:
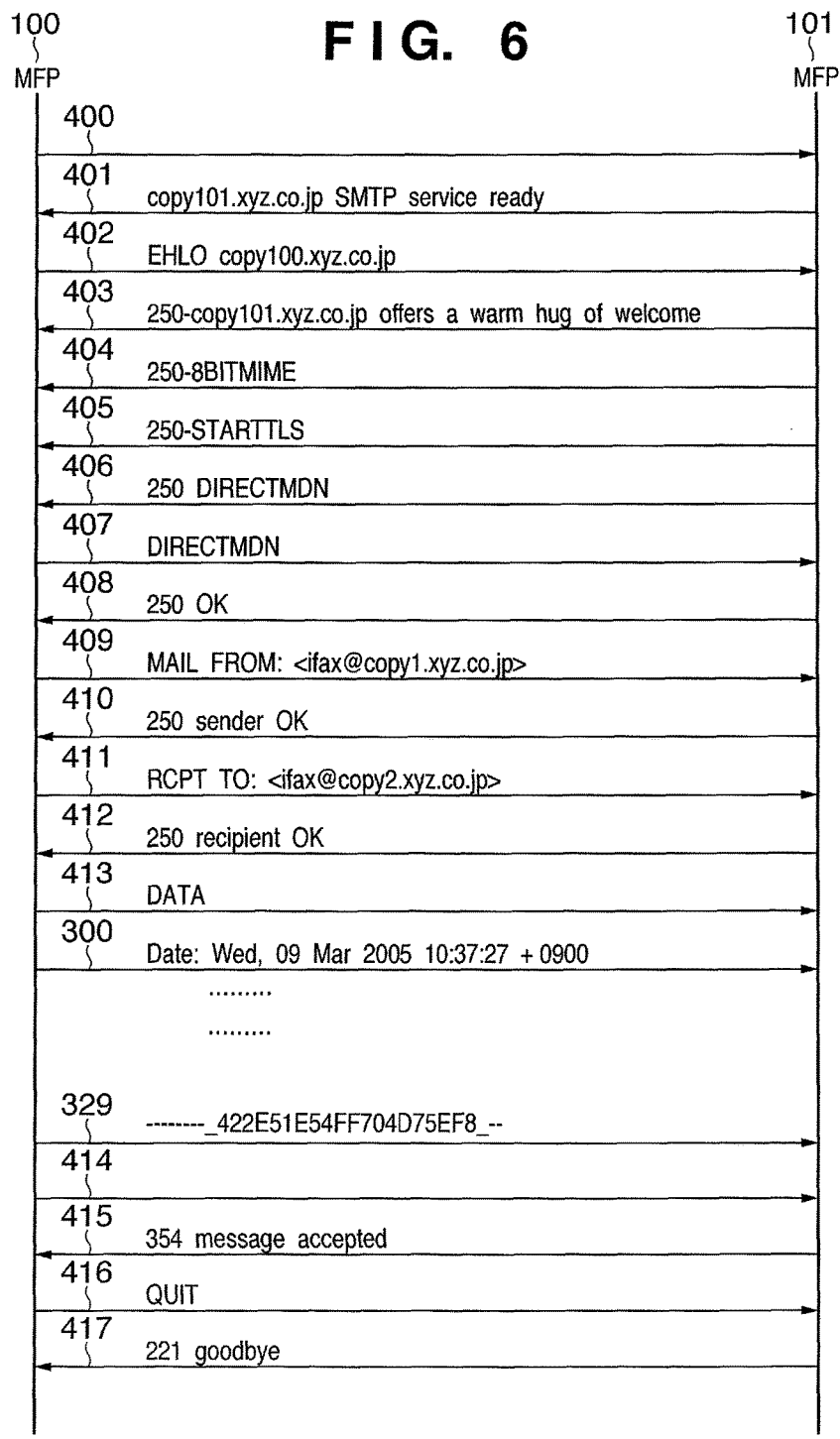
FIG. 6 is a sequence chart showing the process of an SMTP protocol according to the first embodiment of the present invention.

FIG. 6 is a sequence chart showing the process of the SMTP protocol according to the first embodiment of the present invention.

As shown in FIG. 4, the information "server intervention OFF" in the server intervention designation field 252 of the destination table of the MFP 100 indicates that the MFP 100 can directly transmit data to the MFP 101 without intervention of a mail server.

Hence, for transmission to the MFP 101, the MFP 100 directly SMTP-connects to the MFP 101 (400).

The SMTP-connected MFP 101 replys a character string (401) containing domain name information.

When the MFP 100 sends an EHLO command (402), the MFP 101 replys SMTP extension commands compatible to it together with character strings beginning with "250-" (403).

Detailed SMTP extension commands (commands representing the functions of the MFP 101) are indicated by 404 to 406. The MFP 101 has a reception function of receiving 8-bit e-mail data, an encryption function of encrypting a communication path by TLS encryption, and a direct response function of directly replying MDN.

In this case, the MFP 101 transmits, to the MFP 100, an 8BITMIME command (404) representing the 8-bit e-mail data reception function and a STARTTLS command (405) representing the communication path encryption function by TLS encryption. The MFP 101 also transmits, to the MFP 100, a DIRECTMDN command (406) representing the MDN direct response function (response method).

The MFP 101 has a switch to set "ON/OFF of MDN direct response" as device setting. Only when the MDN direct response function is set "ON", the MFP 101 directly replys MDN in response to a DIRECTMDN command (407) from the MFP 100. If the function is set "OFF", the MFP 101 does not directly reply MDN in response to the DIRECTMDN command (407) from the MFP 100.

The DIRECTMDN command (407) from the MFP 100 is a command to request MDN direct response. MDN direct response indicates directly replying MDN to the transmission destination without intervention of a mail server.

If the destination table of the MFP 100 is registered in the destination table in the MFP 101, the set contents ("server intervention ON/OFF") of the server intervention designation field 252 (FIG. 4) can be acquired from the destination table. In this case, whether to permit MDN direct response may be determined on the basis of the set contents. That is, if "server intervention OFF" is set as the set contents, MDN may direct be replyed.

FIG. 6 will be described again.

Upon normally receiving the DIRECTMDN command (407) from the MFP 100, the MFP 101 replys a normal response message (408) beginning with "250".

Next, the MFP 100 transmits, to the MFP 101, a MAIL command (409) representing the mail sender. Upon normally receiving it, the MFP 101 replys a normal response message (410) beginning with "250". The MFP 100 transmits an RCPT command (411) representing the mail recipient. Upon normally receiving it, the MFP 101 replys a normal response message (412) beginning with "250".

The MFP 100 transmits a DATA command (413) indicating that e-mail data transmission will start and then transmits e-mail data (data indicated by the fields 300 to 329 in FIG. 5). After that, the MFP 100 transmits "." (414) indicating the end of e-mail data.

Upon normally receiving the e-mail data from the MFP 100, the MFP 101 replys a normal response message (415) beginning with "354".

The MFP 100 transmits a QUIT command (416) to disconnect. Responding to it, the MFP 101 replys a message (417) beginning with "221".

With the above-described processing, SMTP connection between the MFPs 100 and 101 ends.

SMTP reception processing by the SMTP reception function of the MFP 101 will be described next with reference to FIG. 7.

Figure 7:
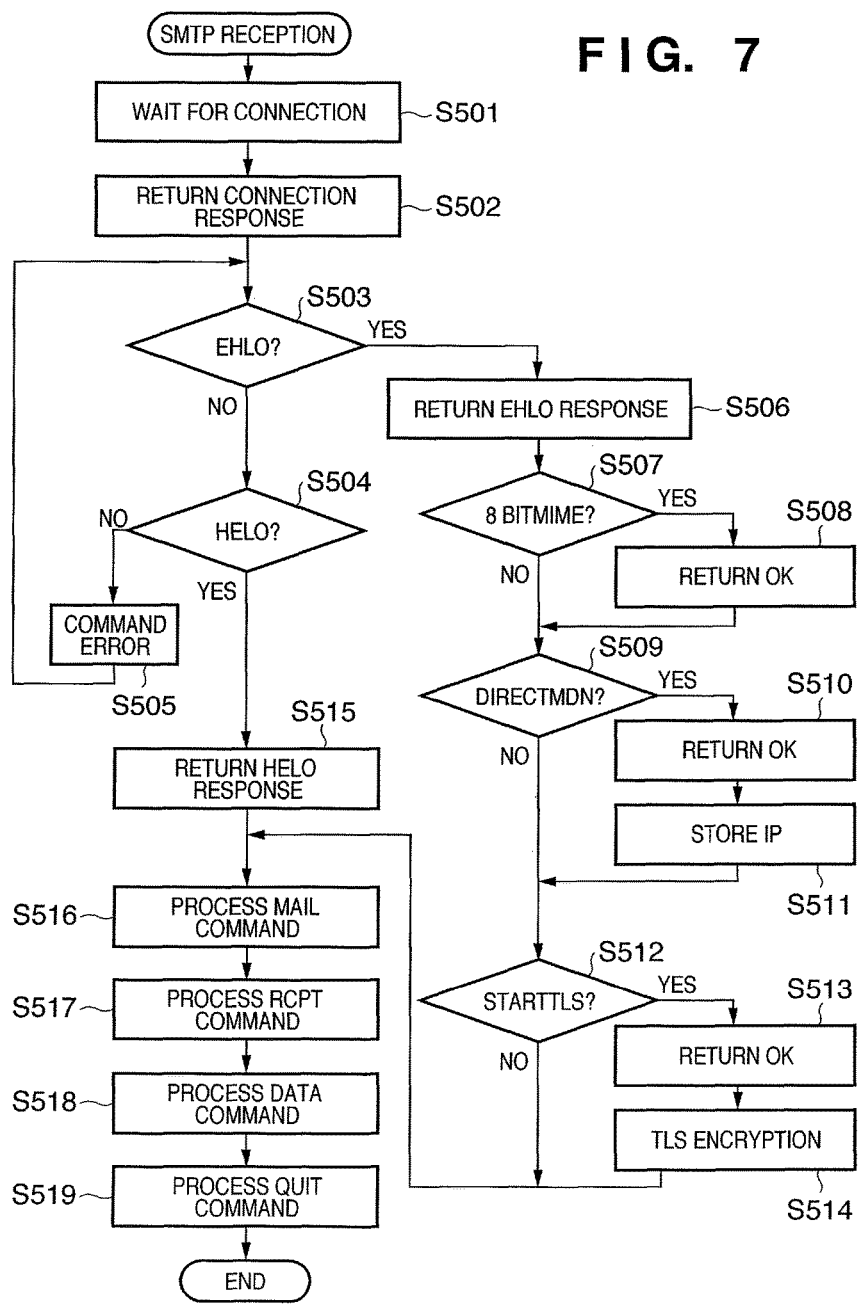
FIG. 7 is a flowchart showing SMTP reception processing according to the first embodiment of the present invention.

FIG. 7 is a flowchart showing SMTP reception processing according to the first embodiment of the present invention.

This SMTP reception processing is done to receive, e.g., e-mail data SMTP-transmitted from the MFP 100 or client PC 104.

At power-on, the SMTP reception function is activated. In step S501, MFP 101 waits for connection.

When SMTP connection starts, the process advances from step S501 to step S502 to execute connection response reply processing (401 in FIG. 6) of replying an SMTP connection response.

After replying the connection response, the MFP 101 checks the received command to determine in step S503 whether the command is an EHLO command. If the command is an EHLO command (YES in step S503), the process advances to step S506. If the command is not an EHLO command (NO in step S503), the MFP 101 determines in step S504 whether the command is a HELO command.

If the command is a HELO command (YES in step S504), the process advances to step S515. If the command is not a HELO command (NO in step S504), the process advances to step S505 to regard the state as a command error and wait for new command reception.

If the received command is a HELO command in step S504, the MFP 101 executes HELO command response reply processing in step S515, and the process advances to step S516.

If the received command is an EHLO command in step S503, the MFP 101 executes EHLO command response reply processing in step S506 to reply, as EHLO command responses, messages containing SMTP extension functions prepared in the MFP 101.

The messages are the 8BITMIME 404, STARTTLS 405, and DIRECTMDN 406 in FIG. 6.

The MFP 101 checks commands producible by its SMTP extension functions. First, the MFP 101 determines in step S507 whether an 8BITMIME command is producible. If no 8BITMIME command is producible (NO in step S507), the process advances to step S509. If an 8BITMIME command is producible (YES in step S507), the process advances to step S508 to execute OK reply processing of replying a character string "250 OK".

The MFP 101 determines in step S509 whether a DIRECTMDN command is producible. If no DIRECTMDN command is producible (NO in step S509), the process advances to step S512. If a DIRECTMDN command is producible (YES in step S509), the process advances to step S510 to execute OK reply processing of replying a character string "250 OK". In step S511, the MFP 101 stores, in the RAM 132, the IP address of the connection request issue source.

The MFP 101 determines in step S512 whether a STARTTLS command is producible. If no STARTTLS command is producible (NO in step S512), the process advances to step S516. If a STARTTLS command is producible (YES in step S512), the process advances to step S513 to execute OK reply processing of replying a character string "250 OK". In step S514, the MFP 101 executes TLS encryption processing.

In step S516, the MFP 101 executes MAIL command processing. The MFP 101 receives sender mail address information set in it as a MAIL command (409 in FIG. 6) and transmits a MAIL command response (410 in FIG. 6) containing a character string beginning with "250".

In step S517, the MFP 101 executes RCPT command processing. The MFP 101 receives an RCPT command (411 in FIG. 6) containing the mail address information of the transmission destination and transmits an RCPT command response (412 in FIG. 6) containing a character string beginning with "250".

In step S518, the MFP 101 executes DATA command reception processing. The MFP 101 receives a DATA command (413 in FIG. 6) indicating that transmission of e-mail data in FIG. 5 will start. The MFP 101 then receives the transmitted e-mail data (300 to 329 and 414 in FIG. 6) and transmits a DATA command response (415 in FIG. 6) containing a character string beginning with "354".

The MFP 101 determines the end of e-mail data by detecting the character string 414 containing only "." and thus ends the series of operations.

In step S519, the MFP 101 executes QUIT command processing. The MFP 101 receives a QUIT command (416 in FIG. 6) to disconnect and replys a QUIT command (417 in FIG. 6) containing a character string beginning with "221" to disconnect the SMTP connection.

When the above-described processing ends, SMTP reception ends.

With the above-described processing, the MFP 101 receives, e.g., the e-mail data shown in FIG. 5. The mail text data (314) of the e-mail data is converted from text information of JIS codes into text information of SJIS codes and then rasterized into image data.

The image data portion (321 to 328) of the e-mail data is BASE64-decoded into a TIFF file. Image data of each page is extracted from the TIFF file and subjected to image decode processing. When image decode processing of all pages is normally complete, MDN data shown in FIG. 8 is created.

A structural example of MDN data according to the first embodiment will be described next.

FIG. 8 is a view showing a structural example of MDN data according to the first embodiment of the present invention.

Fields 600 to 607 in FIG. 8 correspond to the mail header of the mail.

The Date field 600 has time information indicating the time of data transmission. The From field 601 has the e-mail address of the MFP 101 as the mail transmission source. The Subject field 602 has a character string "Message Disposition Notification".

The To field 603 contains a destination set in the Disposition-Notification-To field 304 of the mail with an attached image described with reference to FIG. 5. Hence, the MDN data is transmitted to this destination.

The Message-ID field 604 has a character string containing the transmission time, host name, domain name, and user name information. The character string is generated without permitting existence of data with identical IDs.

The MIME-Version field 605 has the version number of MIME. The Content-Type field 606 contains information indicating that the mail is report-type notification mail.

The field 607 has information indicating that the mail is segmented by a boundary "xiSCzkWI5qc0+uiWI6qaM+ueTIB6". In this example, the mail is segmented by fields 609, 615, and 622. The mail is segmented into a first portion corresponding to fields 610 to 614 and a second portion corresponding to fields 616 to 621.

The field 610 indicates that the first portion is text data. The fields 612 and 613 contain the data character string.

The field 616 indicates that the second portion is a notification message. The field 618 describes the host name and domain name of the MFP 101 that has created this message.

The Original-Message-ID field 619 contains the Message-Id 304 of the mail with an attached image described with reference to FIG. 5 to make it possible to determine the mail to which this notification mail will respond.

The Disposition field 620 indicates that this notification mail is automatically replyed, and the result is normally processed.

MDN transmission processing of causing the MFP 101 to transmit MDN data will be described next with reference to FIG. 9.

Figure 9:
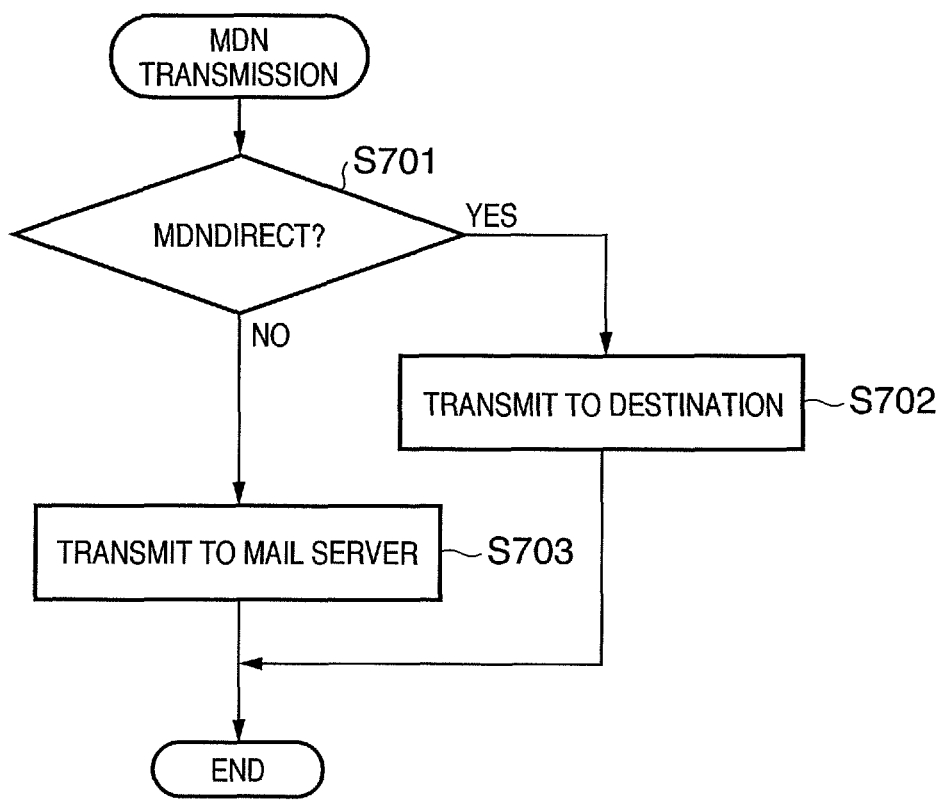
FIG. 9 is a flowchart showing MDN transmission processing according to the first embodiment of the present invention.

FIG. 9 is a flowchart showing MDN transmission processing according to the first embodiment of the present invention.

This processing starts to transmit MDN.

In step S701, the MFP 101 determines whether the sender has designated "MDNDIRECT" by referring to the contents of the DIRECTMDN command (407 in FIG. 6). If "MDNDIRECT" is designated (YES is step S701), the process advances to step S702 to transmit the MDN data in FIG. 8 to a destination corresponding to the IP address stored in step S511 and end the processing.

If no "MDNDIRECT" is designated (NO is step S701), the process advances to step S703 to transmit the MDN data to the mail server (e.g., server 103) and end the processing. The MDN data transmitted to the mail server is finally transmitted, through the mail server, to a destination indicated by Disposition-Notification-To of the mail with an attached image described with reference to FIG. 5.

As described above, according to the first embodiment, in an environment that allows communication by an e-mail protocol without intervention of a mail server, MDN data for transmittal confirmation is also transmitted without intervention of a mail server. On the other hand, in an environment that allows only communication through a mail server, MDN data for transmittal confirmation is transmitted via a mail server.

It is possible to adaptively select the MDN data transmission/reception route in accordance with the environment between apparatuses and reliably transmit MDN data. The transmitting side can determine whether the receiving side has normally received mail and image data attached to it.

Second Embodiment

In the second embodiment, an application example of the MDN transmission processing of the first embodiment will be described.

Figure 10:
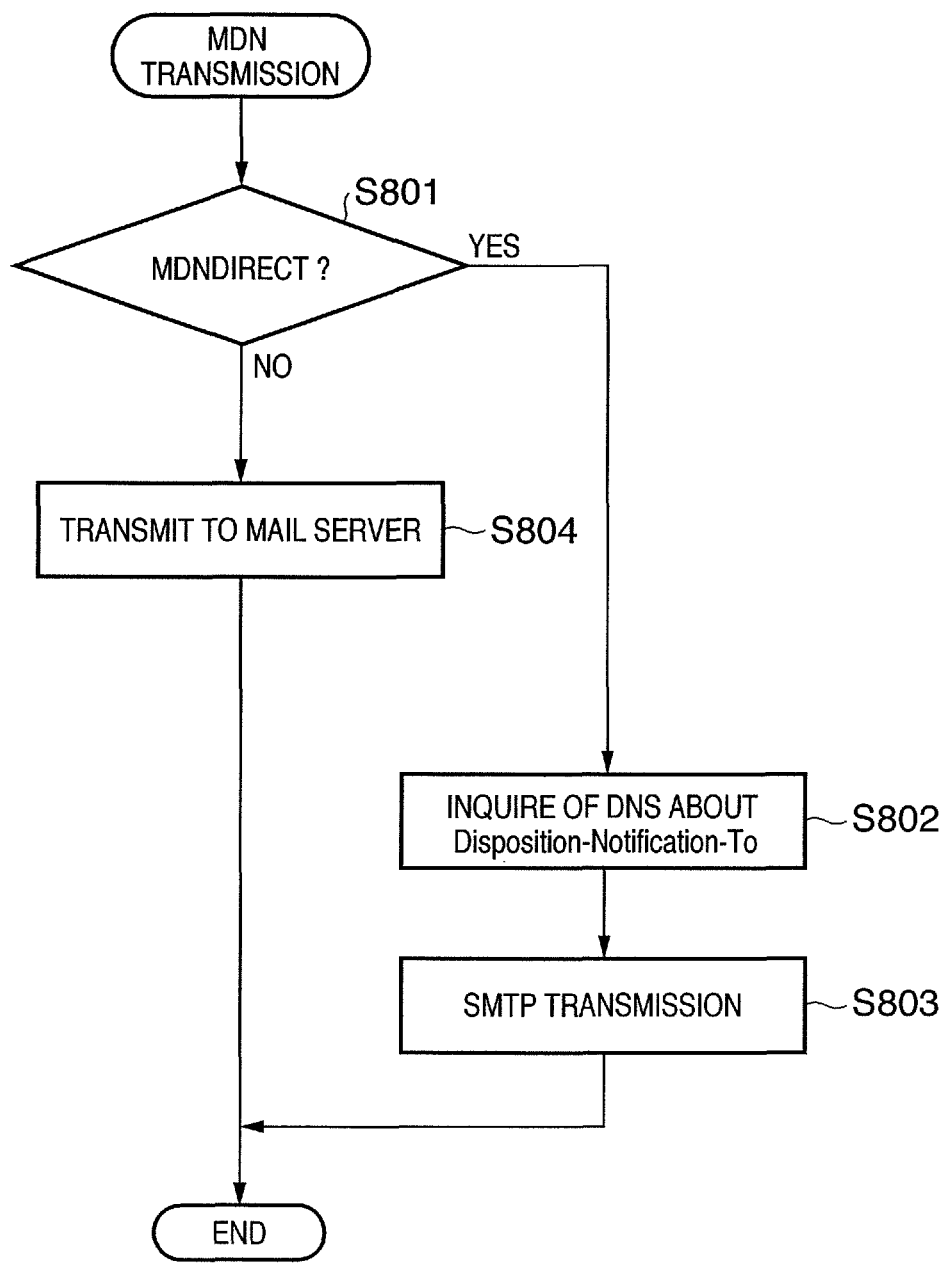
FIG. 10 is a flowchart showing MDN transmission processing according to the second embodiment of the present invention.

FIG. 10 is a flowchart showing MDN transmission processing according to the second embodiment of the present invention.

This processing starts to transmit MDN.

In step S801, an MFP 101 determines whether the sender has designated "MDNDIRECT" by referring to the contents of a DIRECTMDN command (407 in FIG. 6). If "MDNDIRECT" is designated (YES is step S801), the process advances to step S802. In step S802, the MFP 101 inquires of a DNS server (server 103) about a destination indicated by Disposition-Notification-To of mail with an attached image described with reference to FIG. 5 and acquires the IP address of the transmission destination.

The DNS server acquires the IP address of the destination by using the A record of the HOST name or the MX (Mail eXchange) record dedicated for mail transmittal.

In step S803, the MFP 101 transmits MDN data shown in FIG. 8 to the destination corresponding to the IP address acquired in step S802 by using the SMTP protocol and ends the processing.

If no "MDNDIRECT" is designated (NO is step S801), the process advances to step S804 to transmit the MDN data to the mail server (e.g., server 103) and end the processing. The MDN data transmitted to the mail server is finally transmitted, through the mail server, to a destination indicated by Disposition-Notification-To of the mail with an attached image described with reference to FIG. 5.

As described above, the second embodiment specifies the MDN data transmission destination by inquiring of the DNS server about it. Hence, even if it is impossible to specify the MDN data transmission destination from e-mail data, the MDN data can reliably be transmitted to a correct destination.

Third Embodiment

In the first embodiment, an MDN data request is transmitted to a transmission destination in accordance with the SMTP protocol. However, the present invention is not limited to this. For example, e-mail data may contain a description of information indicating an MDN data request.

In the third embodiment, an arrangement that uses e-mail data containing a description of information indicating an MDN data request will be described.

FIG. 11 is a view showing a structural example of e-mail data according to the third embodiment of the present invention.

FIG. 11 shows an e-mail data structure when an image scanned by an MFP 100 is attached to e-mail and transmitted to an MFP 101.

A Date field 900 has time information indicating the time of transmission from the MFP 100. A From field 901 has the e-mail address of the MFP 100. A To field 902 has the e-mail address of the MFP 101. A Subject field 903 has a character string "image".

A Disposition-Notification-To field 904 designates a mail address to receive transmittal confirmation mail (MDN data) transmitted in response to a transmittal confirmation request from the MFP 100. In this example, the field 904 contains the mail address of the MFP 100.

An X-MDNDIRECT field 905 indicates that the sender wants to direct transmission of transmittal confirmation mail to the MFP 100 as a transmitting device without intervention of a mail server.

A Message-ID field 906 has a number representing an ID unique to mail. The number contains mail address and time data to prevent existence of mail messages with the same number. A MIME-Version field 907 has the version number of MIME.

A Content-Type field 908 indicates that the e-mail data is segmented into a plurality of blocks by a character string "-----_422E51E54FF704D75EF8_".

Fields 911 to 916 constitute one block. The field 911 indicates that the following part contains a character string written by JIS codes. The field 915 contains a data character string.

Fields 917 to 931 constitute another block. Pieces of information in the fields 917 to 920 show that this part is a TIFF image file with a file name "GS2005.tif". The fields 922 to 929 have data obtained by BASE64-encoding the file.

The e-mail data according to the third embodiment explicitly describes a transmittal confirmation mail request in addition to the e-mail data structure of the first embodiment.

E-mail data analysis processing when the MFP 101 receives the e-mail data shown in FIG. 11 will be described next with reference to FIG. 12.

Figure 12:
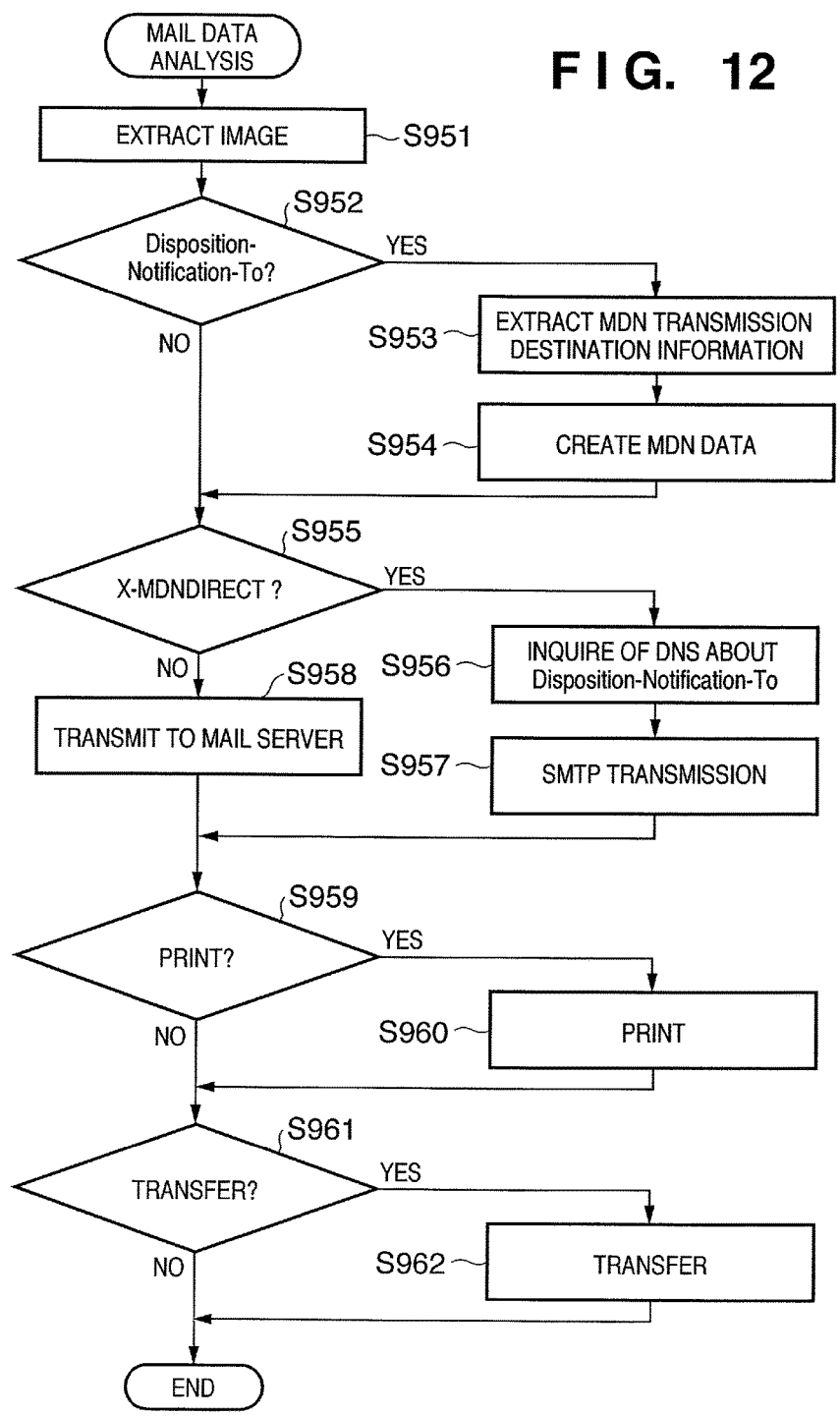
FIG. 12 is a flowchart showing e-mail data analysis processing according to the third embodiment of the present invention.

FIG. 12 is a flowchart showing e-mail data analysis processing according to the third embodiment of the present invention.

Upon receiving e-mail data, the MFP 101 executes image extraction processing in step S951. The mail text data (915 in FIG. 11) is converted from text information of JIS codes into text information of SJIS codes and then rasterized into image data.

The image data portion (922 to 929 in FIG. 11) of the e-mail data is BASE64-decoded into a TIFF file. Image data of each page is extracted from the TIFF file and subjected to image decode processing.

The MFP 101 determines in step S952 whether a destination exists in the Disposition-Notification-To field (904 in FIG. 11).

If a destination exists (YES in step S952), the process advances to step S953 to extract destination information (ifax@copy1.xyz.co.jp") to transmit MDN data. In step S954, the MFP 101 creates MDN data for the destination information and transmits the MDN data.

If no destination exists (NO in step S952), the process advances to step S955 to determine whether an X-MDNDIRECT field (905 in FIG. 11) exists.

If the process advances to step S955 upon determining in step S952 that no destination exists in the Disposition-Notification-To field, the process advances to step S959. This is because the absence of a Disposition-Notification-To field indicates the absence of an MDN request, and therefore, no X-MDNDIRECT field exists in principle. Conversely, to request MDN, it is necessary to add a Disposition-Notification-To field.

If an X-MDNDIRECT field exists (YES in step S955), the process advances to step S956 to inquire of a DNS server about a destination indicated by Disposition-Notification-To and acquire the IP address of the transmission destination.

The DNS server acquires the IP address indicated by Disposition-Notification-To by using the A record of the HOST name or the MX (Mail eXchange) record dedicated for mail transmittal. In step S957, the MFP 101 transmits MDN data to the destination corresponding to the IP address acquired in step S956 by using the SMTP protocol.

If no X-MDNDIRECT field exists (NO in step S955), the MFP 101 transmits the MDN data to a mail server (e.g., server 103) in step S958.

In step S959, the MFP 101 determines the presence/absence of print setting for the image data extracted from the received e-mail data. If print setting exists (YES in step S959), the process advances to step S960 to execute printing in accordance with the print setting. If no print setting exists (NO in step S959), the process advances to step S961 to determine the presence/absence of transfer.

If transfer setting exists (YES in step S961), the process advances to step S962 to execute transfer in accordance with the transfer setting. Examples of the transfer destination based on the transfer setting are file transfer destinations of FAX, IFAX, FTP, and SMB.

If no transfer setting exists (NO in step S961), the processing ends.

The presence/absence of print setting and transfer setting in steps S956 and 961 is done on the basis of, e.g., attribute information set in the e-mail data upon receiving it.

SMTP and POP receptions have been described above as the e-mail reception method. E-mail data may be received by another predetermined communication protocol such as IMAP.

As described above, the third embodiment describes information indicating an MDN data request in e-mail data instead of transmitting an MDN data request in accordance with the SMTP protocol.

This arrangement can prevent the possible disappearance of an MDN data request when, e.g., the MDN data request that should be transmitted directly to the transmission destination in accordance with the SMTP protocol is erroneously transmitted via a mail server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-373519 filed on Dec. 26, 2005, which is hereby incorporated by reference herein in its entirety.

The invention claimed is:

1. A transmission apparatus, comprising:
a memory configured to store instructions;
a processor configured to execute the instructions to generate e-mail data; and
a network interface configured to transmit the e-mail data to a reception apparatus with information, wherein the information is either first information for requesting to transmit, via a mail server, a transmittal confirmation result regarding the e-mail data, or second information for requesting to transmit, not via the mail server, the transmittal confirmation result,
wherein, in correspondence to whether the first information was transmitted or the second information was transmitted, the network interface receives the transmittal confirmation result which is transmitted via the mail server by the reception apparatus, or the network interface receives the transmittal confirmation result which is transmitted not via the mail server by the reception apparatus.

2. The transmission apparatus according to claim 1, wherein the network interface transmits the information as one command of communication protocol used for transmitting the e-mail data.

3. The transmission apparatus according to claim 2, wherein the communication protocol is SMTP protocol.

4. The transmission apparatus according to claim 1, wherein the reception apparatus transmits the transmittal confirmation result via the mail server based on the reception apparatus receiving the first information, or transmits the transmittal confirmation result not via the mail server based on the reception apparatus receiving the second information.

5. The transmission apparatus according to claim 1, further comprising:
a user interface configured to sets whether to transmit the email data generated by the processor via the mail server or to transmit the email data generated by the processor not via the mail server.

6. The transmission apparatus according to claim 1, wherein the network interface receives, from the reception apparatus, apparatus information indicating a method for transmitting the transmittal confirmation result, and
wherein the processor sets the first information or the second information as the information based on the received apparatus information.

7. The transmission apparatus according to claim 6, wherein the processor sets the second information as the information based on the received apparatus information indicating that transmission of the transmittal confirmation result not via the mail server is allowed.

8. The transmission apparatus according to claim 7, wherein the processor sets the first information as the information based on the received apparatus information indicating that transmission of the transmittal confirmation result not via the mail server is not allowed.

9. A transmission apparatus, comprising:
a memory configured to store instructions;
a processor configured to execute the instructions to generate e-mail data, the e-mail data including information for requesting to transmit a transmittal confirmation result regarding the e-mail data, wherein the information is either first information for requesting to transmit, via a mail server, the transmittal confirmation result regarding the e-mail data, or second information for requesting to transmit, not via the mail server, the transmittal confirmation result; and
a network interface configured to transmit the e-mail data, wherein, in correspondence to whether the first information was sent or the second information was sent, the network interface receives the transmittal confirmation result which is transmitted not via the mail server by the reception apparatus, or the network interface receives the transmittal confirmation result which is transmitted via the mail server by the reception apparatus.

10. The transmission apparatus according to claim 9, wherein the information is included in a header field of the e-mail data.

11. The transmission apparatus according to claim 9, further comprising:
a user interface configured to set whether to transmit the email data via the mail server or to transmit the email data not via the mail server.

12. The transmission apparatus according to claim 9, wherein the reception apparatus transmits the transmittal confirmation result via the mail server based on the reception apparatus receiving the email data including the first information or transmits the transmittal confirmation result not via the mail server based on the reception apparatus receiving the email data including the second information.

13. The transmission apparatus according to claim 9, wherein the network interface receives, from the reception apparatus, apparatus information indicating a method for transmitting the transmittal confirmation result, and
wherein the processor sets the first information or the second information as the information based on the received apparatus information.

14. The transmission apparatus according to claim 13, wherein the processor sets the second information as the information based on the received apparatus information indicating that transmission of the transmittal confirmation result not via the mail server is allowed.

15. The transmission apparatus according to claim 14, wherein the processor sets the first information as the information based on the received apparatus information indicating that transmission of the transmittal confirmation result not via the mail server is not allowed.

16. A control method for controlling a transmission apparatus, comprising:
generating, by the transmission apparatus, e-mail data;
transmitting, by the transmission apparatus, the e-mail data to a reception apparatus with information, wherein the information is either first information for requesting to transmit, via a mail server, a transmittal confirmation result regarding the e-mail data, or second information for requesting to transmit, not via the mail server, the transmittal confirmation result;
receiving, by the transmission apparatus, the transmittal confirmation result which is transmitted via the mail server by the reception apparatus in correspondence to transmission of the first information; and
receiving, by the transmission apparatus, the transmittal confirmation result which is transmitted not via the mail server in correspondence to transmission of the second information.

17. A control method for controlling a transmission apparatus, comprising:
generating, by the transmission apparatus, e-mail data, the e-mail data including information for requesting to transmit a transmittal confirmation result regarding the e-mail data, wherein the information is either first information for requesting to transmit, via a mail server, a transmittal confirmation result regarding the e-mail data, or second information for requesting to transmit, not via the mail server, the transmittal confirmation result;
transmitting, by the transmission apparatus, the e-mail data; and
receiving, by the transmission apparatus and in correspondence to whether the first information was transmitted or the second information was transmitted, the transmittal confirmation result which is transmitted not via the mail server by the reception apparatus or the transmittal confirmation result which is transmitted via the mail server by the reception apparatus.

18. A non-transitory computer readable storage medium for storing a computer program for controlling a transmission apparatus, the computer program comprising:
a code to cause the transmission apparatus to generate e-mail data;
a code to cause the transmission apparatus to transmit the e-mail data to a reception apparatus with information, wherein the information is either first information for requesting to transmit, via a mail server, a transmittal confirmation result regarding the e-mail data, or second information for requesting to transmit, not via the mail server, the transmittal confirmation result;
a code to cause the transmission apparatus to receive the transmittal confirmation result which is transmitted via the mail server by the reception apparatus in correspondence to transmission of the first information; and
a code to cause the transmission apparatus to receive, as a response to the transmitted information, the transmission confirmation result which is transmitted not via the mail server in correspondence to transmission of the second information.

19. A non-transitory computer readable storage medium for storing a computer program for controlling a transmission apparatus, the computer program comprising:
a code to cause the transmission apparatus to generate e-mail data, the e-mail data including information for requesting to transmit a transmittal confirmation result regarding the e-mail data, wherein the information is either first information for requesting to transmit, via a mail server, a transmittal confirmation result regarding the e-mail data, or second information for requesting to transmit, not via the mail server, the transmittal confirmation result;
a code to cause the transmission apparatus to transmit the e-mail data; and
a code to cause the transmission apparatus, in correspondence to whether the first information was transmitted or the second information was transmitted, to receive the transmittal confirmation result which is transmitted not via the mail server by the reception apparatus or to receive the transmittal confirmation result which is transmitted via the mail server by the reception apparatus.

\* \* \* \* \*